(12) United States Patent
Shaouy

(10) Patent No.: US 7,940,162 B2
(45) Date of Patent: May 10, 2011

(54) METHOD, SYSTEM AND PROGRAM PRODUCT FOR AUDIO TONAL MONITORING OF WEB EVENTS

(75) Inventor: William P. Shaouy, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 876 days.

(21) Appl. No.: 11/565,237

(22) Filed: Nov. 30, 2006

(65) Prior Publication Data

US 2008/0133725 A1      Jun. 5, 2008

(51) Int. Cl.
G08B 3/00 (2006.01)
G08B 9/00 (2006.01)
G06F 17/00 (2006.01)

(52) U.S. Cl. ........ 340/384.1; 340/286.01; 707/E17.013; 715/205; 463/35

(58) Field of Classification Search .................. None
See application file for complete search history.

(56) References Cited

U.S. PATENT DOCUMENTS

| 6,223,188 | B1* | 4/2001 | Albers et al. ............... 715/205 |
| 6,584,504 | B1 | 6/2003 | Choe |
| 6,996,777 | B2 | 2/2006 | Hiipakka |
| 7,171,466 | B2* | 1/2007 | Van Der Meulen ........... 709/224 |
| 7,188,005 | B2* | 3/2007 | Toba et al. ..................... 701/1 |
| 7,336,172 | B2* | 2/2008 | Govindaraj .................. 340/541 |
| 2001/0006909 | A1* | 7/2001 | Mirasaki et al. ............... 463/35 |
| 2001/0047384 | A1 | 11/2001 | Croy |
| 2002/0053979 | A1* | 5/2002 | Mynatt et al. ............. 340/573.4 |
| 2002/0171546 | A1* | 11/2002 | Evans et al. ................. 340/540 |
| 2003/0061615 | A1* | 3/2003 | Van Der Meulen ............. 725/74 |
| 2004/0249650 | A1 | 12/2004 | Freedman et al. |
| 2008/0048851 | A1* | 2/2008 | Reyes et al. .................. 340/506 |

FOREIGN PATENT DOCUMENTS

WO      WO 9300748 A1     1/1993

* cited by examiner

Primary Examiner — Julie Lieu
(74) Attorney, Agent, or Firm — Schmeiser, Olsen & Watts; Anna L. Linne

(57) ABSTRACT

A method, system and program product for audio tonal monitoring of web events is provided. The method includes mapping at least one event to be monitored to a plurality of audible data characteristics, logging data pertaining to the one event monitored, and notifying of the event monitored and logged. Further, the method includes checking whether the one event monitored is mapped to a plurality of audible data characteristics, and if yes, verifying a configuration of a sound generator to be used for producing the audible data characteristics. Moreover, the method includes retrieving the audible data characteristics mapped to the event, and producing an audio tone with the audible data characteristics mapped for the event monitored, such that the audio tone produced having the audible data characteristics audibly alerts a site owner of the event monitored.

27 Claims, 4 Drawing Sheets

METHOD, SYSTEM AND PROGRAM PRODUCT FOR AUDIO TONAL MONITORING OF WEB EVENTS

FIELD OF THE INVENTION

The present invention relates to the field of monitoring systems and, more particularly, the invention relates to a method, system and computer program product for audio tonal monitoring of web events, such as user actions and traffic at a web site, so that the nature of an event is conveyed by the nature of the audio tone generated.

BACKGROUND OF THE INVENTION

In today's business environment, customers are increasingly conducting online or electronic transactions over the Internet with organizations and/or businesses, such as retailers, banking services, etc. Invariably, with increasing traffic over the Internet, the access time associated with retrieving a web page increases, thus, having an impact on existing and potential customers at a particular web site. As such, there is a need for a business and/or organization to effectively monitor transactions and/or traffic at a web site in order to strengthen their ability to provide goods and/or services to online customers without affecting speed and/or efficiency with which customers conduct transactions at that web site.

SUMMARY OF THE INVENTION

In a first aspect of the invention, there is provided a method for audibly monitoring web events at a web site. The method includes logging data pertaining to at least one event monitored at a web site, notifying of the at least one event monitored and logged. Further, the method includes retrieving a plurality of audible data characteristics mapped to the at least one event, and producing an audio tone having the plurality of audible data characteristics mapped for the at least one event monitored, such that the audio tone produced having the plurality of audible data characteristics audibly alerts a site owner of the at least one event monitored. The method further includes monitoring the at least one event in either real time mode or in batch mode. In an embodiment, the logging step further includes mapping the at least one event to be monitored to the plurality of audible data characteristics. In an embodiment, the retrieving step further includes checking whether the at least one event monitored is mapped to the plurality of audible data characteristics, and if yes, verifying a configuration of a sound generator to be used for producing the plurality of audible data characteristics. In an embodiment, the producing step further includes communicating to the sound generator the plurality of audible data characteristics corresponding to the at least one event monitored. In an embodiment, the plurality of audible data characteristics includes at least one of: duration, pitch, velocity and channel. In an embodiment, the sound generator includes at least one of: a directly connected sound generator and a remotely connected sound generator.

In another aspect of the invention, there is provided a system for audio tonal monitoring of web events. The system includes an action-to-mapping file configured to map a respective event of a plurality of web events to be monitored at a web site to a respective plurality of audible data parameters, a web server configured to log data corresponding to the respective event of the plurality of web events that is monitored, a web event-to-audio manager configured to retrieve from the action-to-mapping file the respective plurality of audible data parameters matching the respective event that is monitored, and a sequencer configured to communicate the respective plurality of audible data parameters retrieved to a sound generator for generating a respective audio tone matching the respective event that is monitored, such that a site owner is audibly alerted of the respective event by listening to the audio tone having the respective plurality of audible data parameters. The system further includes an event-to-audio manager extension configured to notify the web event-to-audio manager of the respective event that is logged. In an embodiment, the web event-to-audio manager is further configured to monitor each of the plurality of web events either in real time mode or in batch mode. In an embodiment, the web event-to-audio manager includes the sequencer, and the web event-to-audio manager is further configured to transmit the respective plurality of audible data parameters retrieved from the action-to-mapping file to the sequencer. In an embodiment, the plurality of audible data parameters includes at least one of: duration, pitch, velocity and channel. In an embodiment, the sound generator includes at least one of: a directly connected sound generator and a remotely connected sound generator.

In yet another aspect of the invention, there is provided a computer program product for tonal audio-based web event monitoring. The computer program product includes a computer readable medium, first program instructions to monitor an event of a plurality of web events to be monitored at a web site, second program instructions to match the event monitored to a plurality of audible data parameters, and third program instructions to generate an audio tone having the plurality of audible data parameters corresponding to the event monitored, such that the audio tone generated having the plurality of audible data parameters audibly alerts a site owner of the event monitored. In an embodiment, the first program instructions include instructions to log data for the event monitored. In an embodiment, the second program instructions include instructions to map a respective plurality of audible data parameters to a respective event of a plurality of web events to be monitored at a web site. In an embodiment, the third program instructions include instructions to monitor the event either in real time mode or in batch mode. Further, in an embodiment, the third program instructions include instructions to retrieve the plurality of audible data parameters matching the monitored event and to send the plurality of audible data parameters to a sound generator for creating the audio tone having the plurality of audible data parameters. In an embodiment, the plurality of audible data parameters includes at least one of: duration, pitch, velocity and channel, and wherein the sound generator includes at least one of: a directly connected sound generator and a remotely connected sound generator. In an embodiment, each of the first, second and third program instructions are stored on the computer readable medium.

Further, in yet another aspect of the invention, there is provided a process for deploying computing infrastructure that includes integrating computer-readable code into a computing system, wherein the code in combination with the computing system is capable of performing a process for audibly monitoring web events at a web site. The process includes mapping a respective plurality of audible data parameters for each event of a plurality of web events to be monitored at a web site, logging data for at least one event monitored at the web site, retrieving a corresponding plurality of audible data parameters matching the at least one event monitored and logged, sending to a sequencer the corresponding plurality of audible data parameters retrieved for the at least one event monitored, and orchestrating generation of a corresponding audio tone having the corresponding plurality of audible data parameters sent for the at least one event monitored, such that the corresponding audio tone generated having the corresponding plurality of audible data parameters audibly alerts a site owner of the at least one event monitored. The process further includes providing an event-to-audio manager for audibly monitoring the at least one event, and configuring the event-to-audio manager for audibly monitoring the at least one event either in real time mode or in batch mode. In an embodiment, the retrieving step further includes checking whether the at least one event monitored is mapped to the corresponding plurality of audible data parameters, and transmitting to the sequencer the corresponding plurality of audible data parameters. In an embodiment, the orchestrating step further includes communicating the corresponding plurality of audible data parameters to a sound generator for producing the corresponding audio tone having the corresponding plurality of audible data parameters. In an embodiment, the plurality of audible data parameters includes at least one of: duration, pitch, velocity and channel. In an embodiment, the sound generator includes at least one of: a directly connected sound generator and a remotely connected sound generator.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
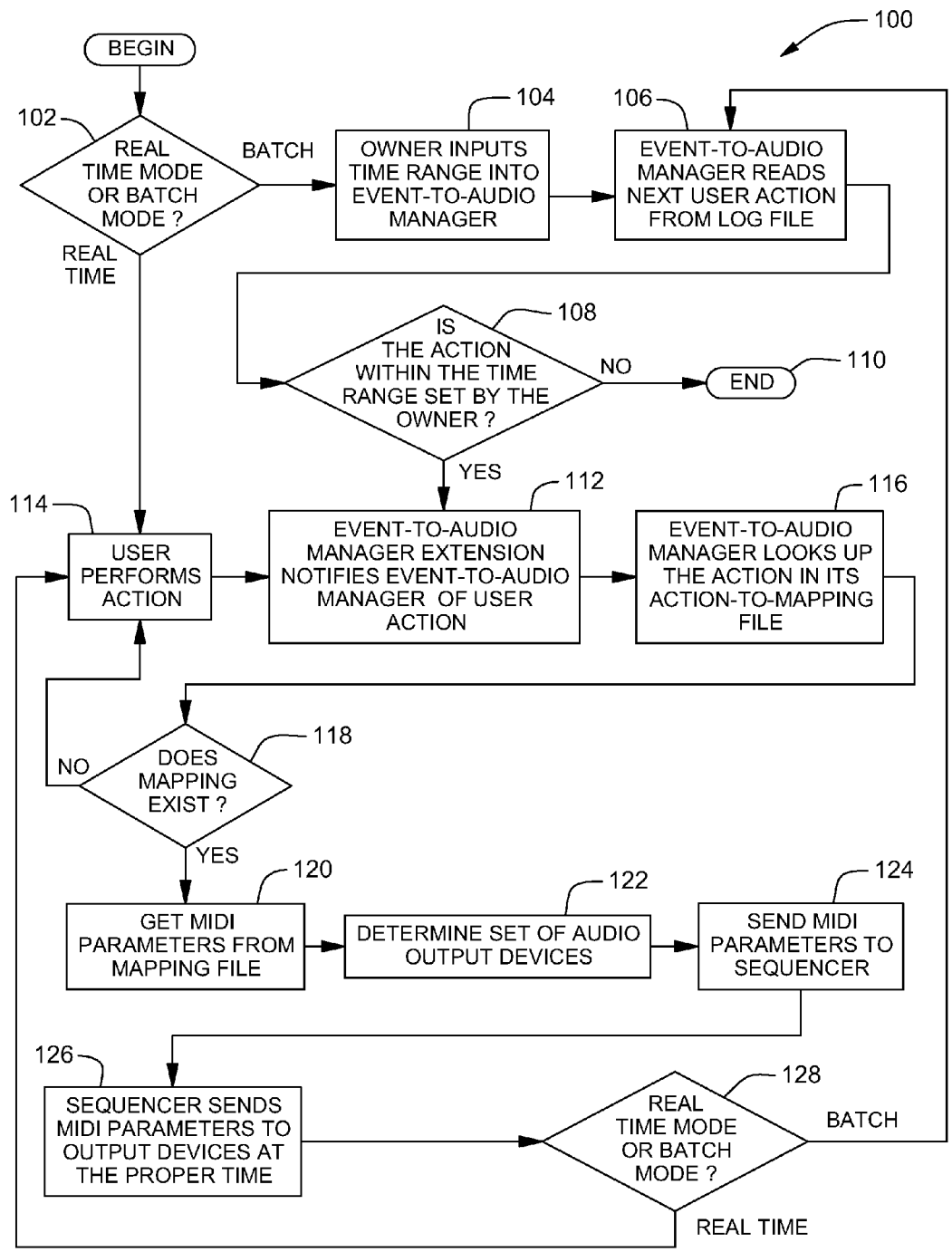
FIG. 1 depicts a flowchart which outlines the steps involved in audio tonal monitoring of web events, in accordance with an embodiment of the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network.

Furthermore, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

In one embodiment, the invention provides a method for audibly monitoring web events at a web site. The method comprises logging data pertaining to at least one event monitored at a web site, notifying of the at least one event monitored and logged. Further, the method comprises retrieving a plurality of audible data characteristics mapped to the at least one event, and producing an audio tone having the plurality of audible data characteristics mapped for the at least one event monitored, such that the audio tone produced having the plurality of audible data characteristics audibly alerts a site owner of the at least one event monitored. In an embodiment, the method further includes monitoring the at least one event in real time mode. Further, in an embodiment, the method includes monitoring the at least one event in batch mode. In an embodiment, the logging step further includes mapping the at least one event to be monitored to the plurality of audible data characteristics. In an embodiment, the retrieving step further includes checking whether the at least one event monitored is mapped to the plurality of audible data characteristics, and if yes, verifying a configuration of a sound generator to be used for producing the plurality of audible data characteristics. In an embodiment, the producing step further includes communicating to the sound generator the plurality of audible data characteristics corresponding to the at least one event monitored. In an embodiment, the plurality of audible data characteristics includes at least one of: duration, pitch, velocity and channel. In an embodiment, the sound generator includes at least one of: a directly connected sound generator and a remotely connected sound generator.

Reference is now made to FIG. 1, which outlines the method steps involved in audio tonal monitoring of web events. Turning to FIG. 1, numeral 100 shows a flowchart that outlines the method steps for audio monitoring of web events, such as, web user actions and traffic at a server or remotely, in real time mode or in batch mode, in accordance with an embodiment of the invention. The method begins at step 102 where a determination is made as to whether the audio monitoring of web user actions and traffic is to be achieved in real time mode or in batch mode. If the audio monitoring of web events is to be achieved in batch mode, the method continues at step 104, with a web site owner or an administrator of a web site inputting a time range into an event-to-audio manager tool or program that is configured to monitor web events. The event-to-audio manager tool or program (often referred to as the event-to-audio manager or EAM) will be discussed further in detail herein below with respect to FIGS. 2 and 3. In step 106, the event-to-audio manager reads the next user action or event from a log file that stores logs of web events or actions. A determination is made in step 108 as to whether or not the user action is within the time range set by the owner. If the action is not within the time range set by the owner, the process ends in step 110. However, if the action is within the time range set by the owner, an event-to-audio manager extension, that is configured to notify the event-to-audio manager, notifies in step 112 the event-to-audio manager of the user action. The event-to-audio manager looks up in step 116 the user action in an action-to-mapping file, which is configured to map a respective web event of a plurality of web events to a plurality of audible data parameters or MIDI (Musical Instrument Digital Interface) parameters. In step 118, a determination is made as to whether a mapping exists for the user action in the action-to-mapping file. If a mapping is found to exist in step 118, the method continues in step 120, with the event-to-audio manager getting the plurality of audible data parameters or MIDI parameters that matches the user action from the action-to-mapping file. The event-to-audio manager determines in step 122 a set of audio output devices or sound generators to be used for generating the audio tone having the plurality of audible data parameters or MIDI parameters. For instance, the configuration file may indicate that the MIDI data is to be sent to one or more directly connected sound generators or that a broadcast signal is to be sent to one or more remote devices, such as, remote sound generators or MIDI-enabled handheld devices, such as cell phones, or that the MIDI data is to be sent to both directly connected sound generators and to remote sound generators. The event-to-audio manager sends in step 124 the audible data parameters or MIDI parameters to a sequencer. The sequencer, which is configured to orchestrate the set of audio output devices set forth in the configuration file, sends in step 126 the audible data parameters or MIDI parameters to the audio output devices or sound generators at the proper time, so that the sound generators can generate the audio tone having the audible data parameters or MIDI parameters. In step 128, if the monitoring of web events is to be carried out in batch mode, the method is repeated as described above starting with step 106 with the event-to-audio manager reading the next user action from the log file. As such, the nature of the user event or action is conveyed by the nature of the audio tones generated and the owner is audibly alerted of the user event by simply listening to the audio tone(s) generated on the connected or remote device(s). Referring back to step 102, if a determination is made that the audio monitoring of web user actions and traffic is to be achieved in real time mode, the event-to-audio manager monitors for user actions and in step 114 as a user performs an action, the event-to-audio manager extension that is configured to notify the event-to-audio manager notifies in step 112 the event-to-audio manager of the user action. The event-to-audio manager looks up in step 116 the user action in the action-to-mapping file. In step 118, a determination is made as to whether a mapping exists for the user action in the action-to-mapping file. If a mapping is found to exist in step 118, the method continues in step 120, with the event-to-audio manager getting the audible data parameters or MIDI parameters that matches the user action from the action-to-mapping file. The event-to-audio manager determines in step 122 a set of audio output devices or sound generators to be used for generating the audio tone having the plurality of audible data parameters or MIDI parameters. The event-to-audio manager sends in step 124 the audible data parameters or MIDI parameters to a sequencer. The sequencer sends in step 126 the audible data parameters or MIDI parameters to the audio output devices or sound generators at the proper time, so that the sound generators can generate the audio tone having the audible data parameters or MIDI parameters. In step 128, if the monitoring of web events is to be carried out in real time mode, the method as described above is repeated starting with step 114, where the event-to-audio manager monitors for web events and waits till a user performs an action in step 114. Accordingly, the event-to-audio manager leverages the data that is logged for an event monitored at a web site. As such, not only are audio tones played upon user events, but additionally the nature of an event is conveyed by the nature of the audio tone.

In another embodiment, the invention provides a system for audio tonal monitoring of web events. The system comprises an action-to-mapping file configured to map a respective event of a plurality of web events to be monitored at a web site to a respective plurality of audible data parameters, a web server configured to log data corresponding to the respective event of the plurality of web events that is monitored, a web event-to-audio manager configured to retrieve from the action-to-mapping file the respective plurality of audible data parameters matching the respective event that is monitored, and a sequencer configured to communicate the respective plurality of audible data parameters retrieved to a sound generator for generating a respective audio tone matching the respective event that is monitored, such that a site owner is audibly alerted of the respective event by listening to the audio tone having the respective plurality of audible data parameters. The system further includes an event-to-audio manager extension configured to notify the web event-to-audio manager of the respective event that is logged. In an embodiment, the web event-to-audio manager is further configured to monitor each of the plurality of web events either in real time mode or in batch mode. In an embodiment, the web event-to-audio manager includes the sequencer, and the web event-to-audio manager is further configured to transmit the respective plurality of audible data parameters retrieved from the action-to-mapping file to the sequencer. In an embodiment, the plurality of audible data parameters includes at least one of: duration, pitch, velocity and channel. In an embodiment, the sound generator includes at least one of: a directly connected sound generator and a remotely connected sound generator.

Figure 2:
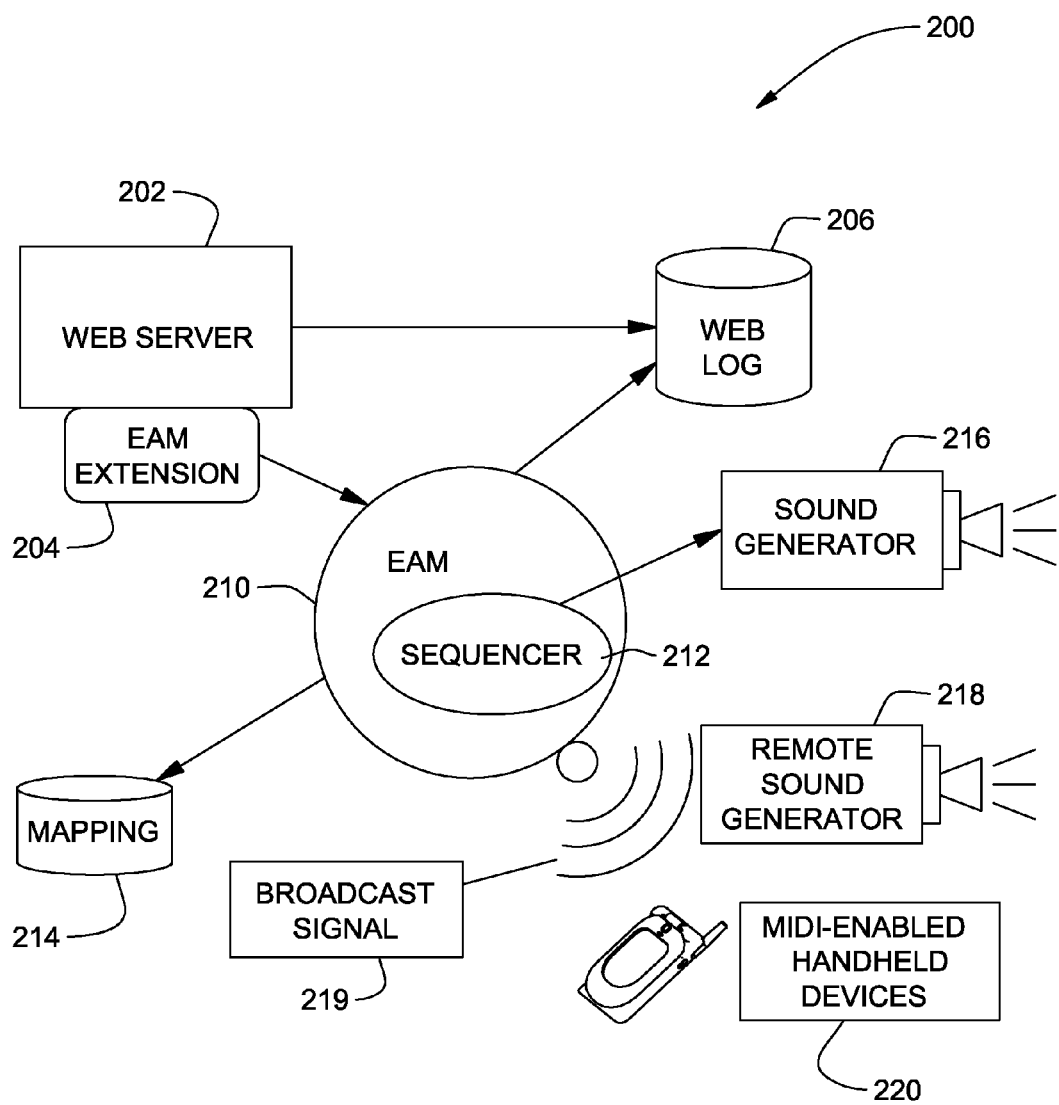
FIG. 2 is a schematic block system diagram illustrating an embodiment of a system for audio tonal monitoring of web events, in accordance with an embodiment of the present invention.
Figure 3:
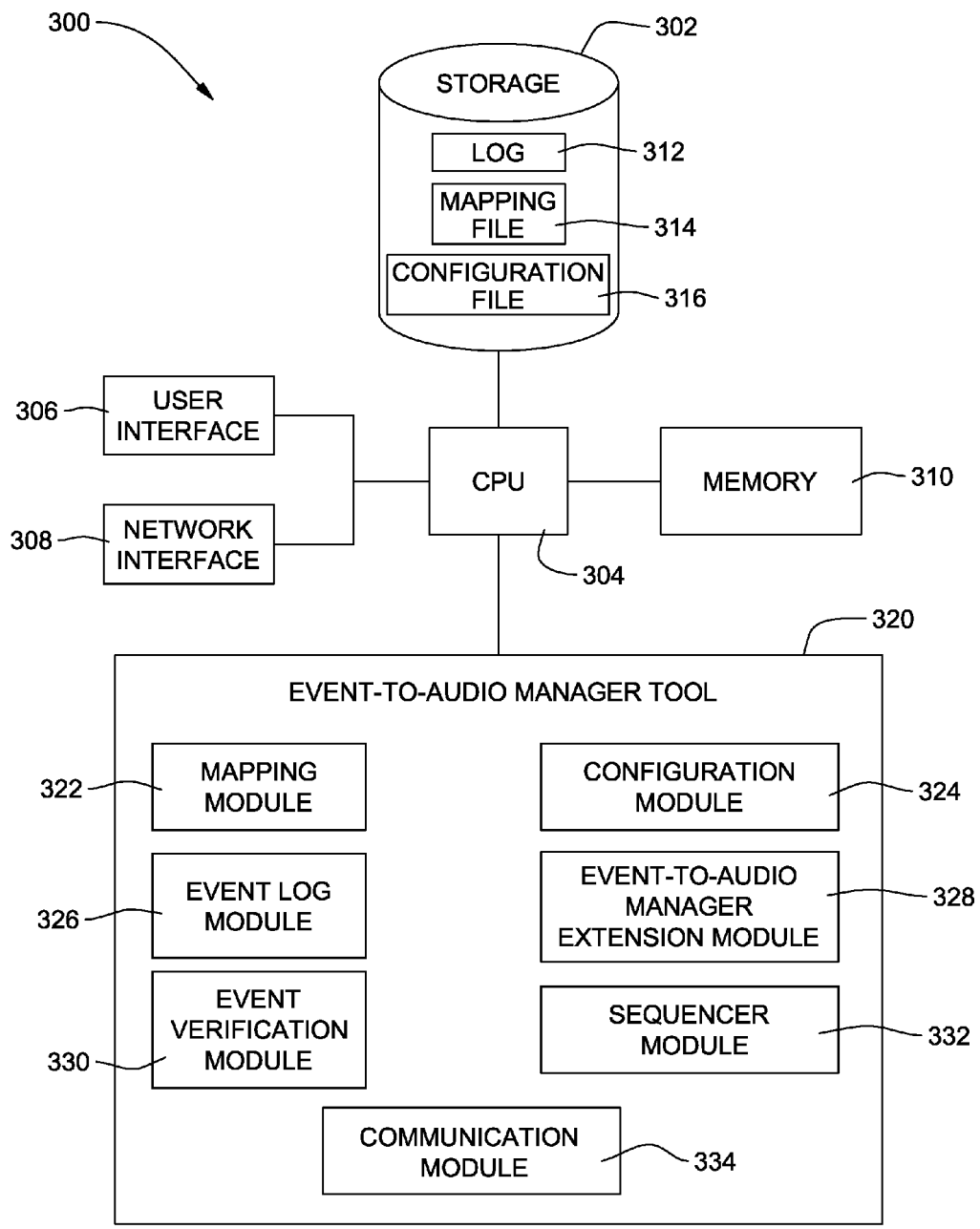
FIG. 3 is a schematic block system diagram illustrating an embodiment of a system for audio tonal monitoring of web events, in accordance with an embodiment of the invention.

Reference is now made to FIGS. 2 and 3, which illustrate various embodiments of a system for audio tonal monitoring of web events. Turning to FIG. 2, reference numeral 200 provides a schematic block diagram of an embodiment of a system 200 for audio tonal monitoring of web events. The system 200 comprises a web server 202 that is configured to load a file from a disk and serve it across a network to a user's web browser. When a user performs a specific action, the web server 202 logs an entry to a web log file 206. The event-to-audio manager extension 204 (also referred to herein as a web extension) interfaces with an event-to-audio manager 210 and notifies the event-to-audio manager 210 of the specific user action logged. The event-to-audio manager 210 looks up or checks to whether or not that specific action is mapped in the action-to-mapping file 214, so that the event-to-audio manager 210 can retrieve certain audible characteristics or MIDI parameters, such as, duration, pitch, velocity (volume) and channel (or timbre) that corresponds to that specific action. The event-to-audio manager 210 contains a MIDI sequencer 212, which is configured to connect to a sound generator or a broadcast device that broadcasts the MIDI parameters to a remote device, for example, a remote sound generator, personal computer or MIDI-enabled handheld device. If a mapping is not found, then the event-to-audio manager does nothing. However, if a mapping is found to exist in the action-to-mapping file 214, the event-to-audio manager 210 checks a configuration file to determine what kind of audio output device or devices to communicate the MIDI data or audible characteristics or parameters to. For instance, the configuration file may indicate to the sequencer 212 to send the MIDI data to a directly connected sound generator or to a send a broadcast signal 219 to a remote device, such as, as remote sound generator or a MIDI-enabled handheld device, or to send the data to both types of devices. After the event-to-audio manager determines which audio output device(s) or sound generator(s) to send the signal to, the event-to-audio manager 210 sends the MIDI parameters to the MIDI sequencer 212. The MIDI sequencer 212 sends the MIDI parameters or data to the sound generator(s) or audio output device(s) 216, 218 and/or 220, as set forth in the configuration file, in order to generate a sound having the particular parameters, for instance, duration, pitch, volume and timbre, corresponding to an audio tone for the user action captured. In an embodiment, the event-to-audio manager 210 can also access the web log file 206 that the web server 202 writes to when the audio tonal monitoring is carried out in batch mode. In particular, the site owner specifies in the configuration file a time range to the event-to-audio manager 210, which reads the web log file 206 for user action(s) that fall within that time range.

Reference is now made to FIG. 3, which illustrates an embodiment of a system for audio tonal monitoring of web events. Turning to FIG. 3, FIG. 3 is a schematic block system diagram illustrating one embodiment of a system or server 300 having an event-to-audio manager program component or tool 320 deployed thereon, the event-to-audio manager program component or tool 320 being configured to perform audio monitoring of web events, such as, web user actions and traffic at a server or remotely, in real time mode or in batch mode, in accordance with an embodiment of the invention. Preferably, the system 300 is a server, for instance, a web monitoring server that includes a central processing unit (CPU) 304, a local storage device 302, a user interface 306, a network interface 308, and a memory 310. The CPU 304 is configured generally to execute operations within the web monitoring system/server 300. The user interface 306, in one embodiment, is configured to allow a user to interact with the web monitoring system 300, including allowing input data and commands from a user and communicating output data to the user. The network interface 308 is configured, in one embodiment, to facilitate network communications of the system 300 over a communications channel of a network (not shown in any of the drawings). In an embodiment, the local memory 310 is configured to store one or more programs (not shown) that are used by the system 300. Further, in an embodiment, an event log 312, which contains a log of all the web events or user actions is stored in storage system 302. Furthermore, in an embodiment, the mapping file 314 (also referred to as the action-to-mapping file, which maps a user action to certain MIDI parameters or characteristics), as well as the configuration file 316, which contains configuration data as to what types of audio output devices or sound generators to communicate the MIDI parameters to, is stored in storage 302. Alternatively, the log file 312, the mapping file 314 and/or the configuration file 316 may be stored in memory 310 or in a separate storage.

In one embodiment, as shown in FIG. 3, the event-to-audio manager program or tool 320 which runs on the server or system 300 comprises a logic unit that contains a plurality of modules configured to functionally execute the necessary steps of performing audio tonal monitoring of web events. In particular, the event-to-audio manager component or tool 320 includes a mapping module 322, a configuration module 324, an event log module 326, an event-to-audio manager extension module 328, an event verification module 330, a sequencer module 332 and a communication module 332. The mapping module 322 of the event-to-audio manager program or tool 320 is configured to map an event to a plurality of audible data characteristics or MIDI parameters or characteristics, such as, duration, pitch, velocity (volume), and channel (timbre). The configuration module 324 is configured to communicate to the event-to-audio manager whether the monitoring is to be conducted in real time mode or in batch mode. Further, the configuration module 324 is configured to provide to the event-to-audio manager the kind of audio output device or sound generator that will be used to generate a sound. Furthermore, the event log module 326 is configured to log data for monitored web events in a web log file. The event-to-audio manager extension module 328 is configured to notify the event-to-audio manager of a user action that is performed. Moreover, the event verification module 330 is configured to check whether a mapping of the event logged to a plurality of MIDI parameters exists in the mapping file. The sequencer module 332 is configured to send the MIDI parameters to orchestrate the one or more sound generators, which generate the sound or audio tone corresponding to the MIDI parameters. Further, the communication module 332 is configured to permit communication between the various modules of the event-to-audio manager component or tool 320 and the various components, such as the web server, the event-to-audio manager, the mapping file, the web log file and the one or more sound generators. As mentioned herein above, the nature of the user event or action is conveyed by the nature of the audio tones generated and the owner is audibly alerted of the user event by simply listening to the audio tone(s) generated on the connected or remote device(s).

For example, a user action or event that may be monitored or captured and communicated audibly is when a user clicks on a link at a web site and a new page loads. As such, the web or EAM extension notifies the EAM (event-to-audio manager) of this event. The EAM (event-to-audio manager) looks up the action or event in its action-to-mapping file, and finds for the page load event or action an audio tone to be generated with the following audible characteristics or MIDI parameters: duration: 5; pitch: 62; velocity: 68 and channel: 3. The EAM (event-to-audio manager) checks the configuration file whether to send a MIDI (Musical Instrument Digital Interface) signal to a directly-connected sound generator, or to send a broadcast signal to a remote device, such as, a remote sound generator, or a MIDI-enabled handheld, etc., or to both types of sound generators. For example, if the sound generator is an administrator's or a web site owner's cell phone, then the MIDI broadcast signal or message will go to the administrator's or a web site owner's cell phone. The event-to-audio manager sends the MIDI parameters (that is, duration, pitch, velocity, and channel) to an internal MIDI sequencer, which in turn sends the MIDI parameters or data to that cell phone (via a broadcast signal) to generate a sound or an audio tone with the following audible characteristics: duration: 5; pitch: 62; velocity: 68 (this is typically translated to loudness); and channel: 3 (this is typically translated to timbre). As a result, the cell phone plays an audio tone having the audible characteristics mentioned herein above, such that, the nature of the user event or action, in this example, the page load action is conveyed to the listener of the cell phone by the characteristics of the audio tone generated and, accordingly, the administrator or owner is audibly alerted of the page load event by simply listening to the audio tone generated on the cell phone In yet another embodiment, the invention provides a computer program product for tonal audio-based web event monitoring. The computer program product comprises a computer readable storage medium, which provides program code for use by or in connection with a computer or any instruction execution system. For the purposes of this description, a computer readable storage medium can be any apparatus that can store, communicate, propagate, or transport the program for use by or in connection with the instruction execution system, apparatus, or device. Preferably, the computer readable storage medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Further, preferably, network medium can comprise of transmission devices on a network, such as, cables, routers, switches and/or network adapter cards.

The computer program product further comprises first program instructions to monitor an event of a plurality of web events to be monitored at a web site, second program instructions to match the event monitored to a plurality of audible data parameters, and third program instructions to generate an audio tone having the plurality of audible data parameters corresponding to the event monitored. In an embodiment, the first program instructions include instructions to log data for the event monitored. In an embodiment, the second program instructions include instructions to map a respective plurality of audible data parameters to a respective event of a plurality of web events to be monitored at a web site. In an embodiment, the third program instructions include instructions to monitor the event either in real time mode or in batch mode. Further, in an embodiment, the third program instructions include instructions to retrieve the plurality of audible data parameters matching the monitored event and to send the plurality of audible data parameters to a sound generator for creating the audio tone having the plurality of audible data parameters. In an embodiment, the plurality of audible data parameters includes at least one of: duration, pitch, velocity and channel, and wherein the sound generator includes at least one of: a directly connected sound generator and a remotely connected sound generator. In an embodiment, each of the first, second and third program instructions are stored on the computer readable medium.

Figure 4:
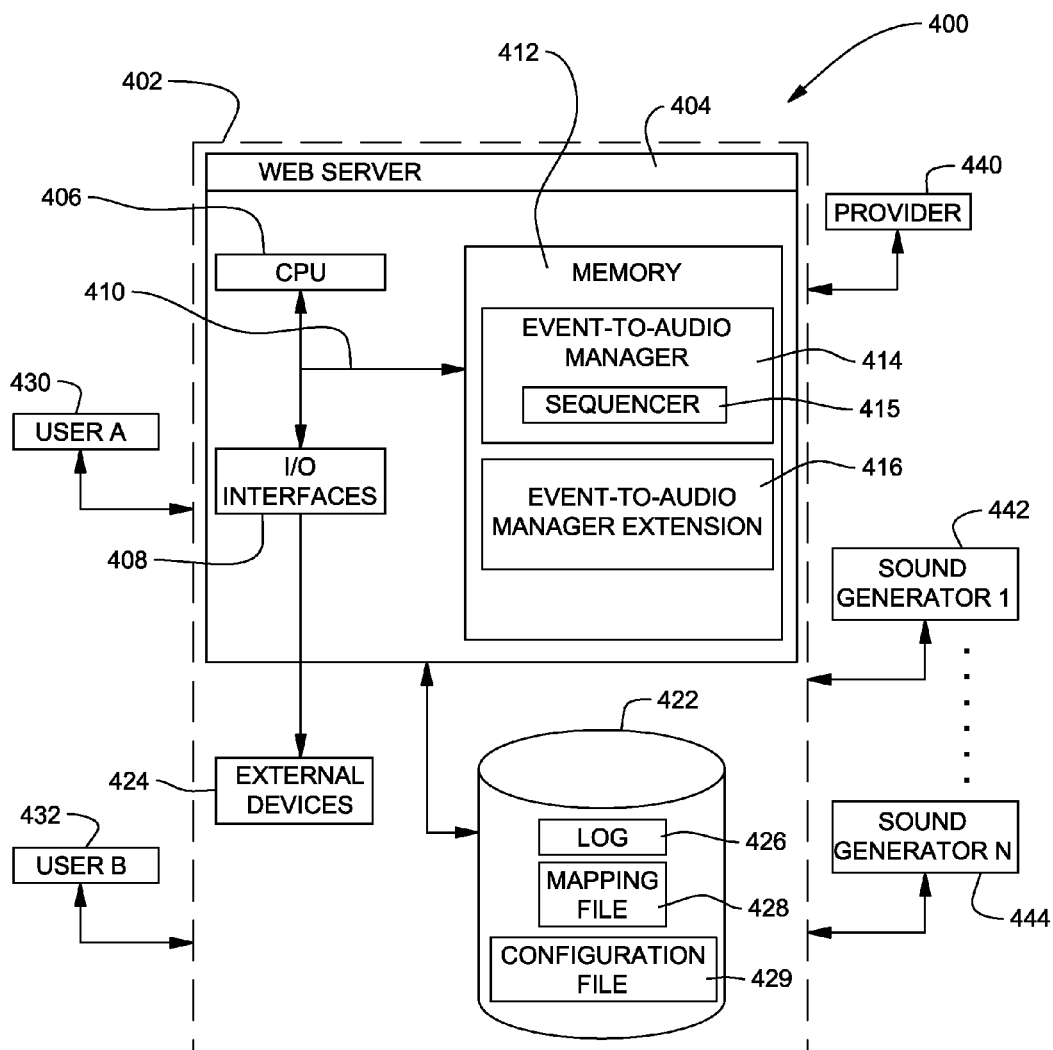
FIG. 4 is a schematic block system diagram illustrating an embodiment of a computer infrastructure for audio tonal monitoring of web events, in accordance with an embodiment of the invention.

Referring now to FIG. 4, there is illustrated a system 400 for tonal audio-based web event monitoring of web user actions and traffic, in accordance with an embodiment of the present invention. As depicted, system 400 includes a computer infrastructure 402, which is intended to represent any type of computer architecture that is maintained in a secure environment (i.e., for which access control is enforced). As shown, infrastructure 402 includes a computer system 404 that typically represents a web server 404 or the like configured to audibly monitor web events at web sites on the web server 404 that is accessed by a client (e.g., a personal computer, a laptop, a handheld device, etc), for instance, user A 430. It should be understood, however, that although not shown, other hardware and software components (e.g., additional computer systems, routers, firewalls, etc.) could be included in infrastructure 402.

In general, a user (for instance, user A, reference numeral 430) at a client is connected via a network to infrastructure 402, which includes an audio tonal web monitoring system configured to monitor web events, such as user actions and traffic at one or more web sites on the web server 404. Similarly, one or more users, such as user A 430, reference numeral 430 and/or user B, reference numeral 432, can interface with infrastructure 402, which is configured to monitor user actions at one or more web sites on the web server 404. To this extent, infrastructure 402 provides a secure environment. In particular, a client accesses the web server or system 404 over a network via interfaces (e.g., web browsers) loaded on the client, for example, a personal computer, a laptop, a handheld device, etc. In the case of the latter, the network can be any type of network such as the Internet, a local area network (LAN), a wide area network (WAN), a virtual private network (VPN), etc. In any event, communication with infrastructure 402 could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, the parties could utilize an Internet service provider to establish connectivity to infrastructure 402. It should be understood that under the present invention, infrastructure 402 could be owned and/or operated by a party such as provider 440, or by an independent entity. Regardless, use of infrastructure 402 and the teachings described herein could be offered to the parties on a subscription or fee-basis. In either scenario, an administrator (not shown in FIG. 4) could support and configure infrastructure 402.

The web server 404 is shown to include a CPU (hereinafter "processing unit 406"), a memory 412, a bus 410, and input/output (I/O) interfaces 408. Further, the web server 404 is shown in communication with external I/O devices/resources 424 and storage system 422. In general, processing unit 406 executes computer program code, such as the event-to-audio manager program or tool 414, which includes a sequencer 415, and the event-to-audio manager extension 416 stored in memory 412. While executing the event-to-audio manager computer program or code 414, the processing unit 406 can read and/or write data, to/from memory 412, storage system 422, and/or I/O interfaces 408 and can produce audio tones based on the MIDI parameters stored in the mapping file 428 on one or more sound devices or generators, such as, sound generator 1, reference numeral 442 and/or up to sound generator N, reference numeral 444, such that an audio tone generated conveys the nature of the user event to a listener connected to a sound device. For instance, in one embodiment, the event log file 426 that the web server 404 writes to is stored in storage 422 and can be accessed by the web server 404 and/or the event-to-audio manager 414. Further, the mapping or action-to-mapping file 428, which maps actions to audible data characteristics or parameters, is stored in storage 422, and can be accessed by the event-to-audio manager 414. Similarly, in an embodiment, the configuration file 429, which contains configuration data as to what types of audio output devices or sound generators to communicate the MIDI parameters to, is stored in storage 422. Alternatively, the log file 426, the mapping file 428 and/or the configuration file 429 could be stored in a separate storage within the infrastructure 402. Bus 410 provides a communication link between each of the components in computer system 400, such that information can be communicated within the infrastructure 402. External devices 424 can comprise any devices (e.g., keyboard, pointing device, display, etc.) that enable a user to interact with computer system 400 and/or any devices (e.g., network card, modem, etc.) that enable web server 404 to communicate with one or more other computing devices.

Computer infrastructure 402 is only illustrative of various types of computer infrastructures for implementing the invention. For example, in one embodiment, computer infrastructure 402 comprises two or more computing devices (e.g., a server cluster) that communicate over a network to perform the various process steps of the invention. Moreover, computer system 400 is only representative of various possible computer systems that can include numerous combinations of hardware. To this extent, in other embodiments, computer system 400 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 406 may comprise a single processing unit, or be distributed across one or more processing units in one or more locations, e.g., on a client and server. Similarly, memory 412 and/or storage system 422 can comprise any combination of various types of data storage and/or transmission media that reside at one or more physical locations. Further, I/O interfaces 408 can comprise any system for exchanging information with one or more external devices 424. Still further, it is understood that one or more additional components (e.g., system software, math co-processing unit, etc.) not shown in FIG. 4 can be included in computer system 400. However, if computer system 400 comprises a handheld device or the like, it is understood that one or more external devices 424 (e.g., a display) and/or storage system(s) 422 could be contained within computer system 400, not externally as shown.

Storage system 422 can be any type of system (e.g., a database) capable of providing storage for information under the present invention. To this extent, storage system 422 could include one or more storage devices, such as a magnetic disk drive or an optical disk drive. In another embodiment, storage system 422 includes data distributed across, for example, a local area network (LAN), wide area network (WAN) or a storage area network (SAN) (not shown). Although not shown, additional components, such as cache memory, communication systems, system software, etc., may be incorporated into computer system 400.

Further, in yet another embodiment, the invention provides a process for deploying computing infrastructure that comprises integrating computer-readable code into a computing system, wherein the code in combination with the computing system is capable of performing a process for audibly monitoring web events at a web site. The process comprises mapping a respective plurality of audible data parameters for each event of a plurality of web events to be monitored at a web site, logging data for at least one event monitored at the web site, retrieving a corresponding plurality of audible data parameters matching the at least one event monitored and logged, sending to a sequencer the corresponding plurality of audible data parameters retrieved for the at least one event monitored, and orchestrating generation of a corresponding audio tone having the corresponding plurality of audible data parameters sent for the at least one event monitored, such that the corresponding audio tone generated having the corresponding plurality of audible data parameters audibly alerts a site owner of the at least one event monitored. The process further includes providing an event-to-audio manager for audibly monitoring the at least one event, and configuring the event-to-audio manager for audibly monitoring the at least one event either in real time mode or in batch mode. In an embodiment, the retrieving step further includes checking whether the at least one event monitored is mapped to the corresponding plurality of audible data parameters, and transmitting to the sequencer the corresponding plurality of audible data parameters. In an embodiment, the orchestrating step further includes communicating the corresponding plurality of audible data parameters to a sound generator for producing the corresponding audio tone having the corresponding plurality of audible data parameters. In an embodiment, the plurality of audible data parameters includes at least one of: duration, pitch, velocity and channel. In an embodiment, the sound generator includes at least one of: a directly connected sound generator and a remotely connected sound generator.

Accordingly, any of the components of the present invention as shown in FIG. 4 can be deployed, managed, serviced by a service provider 440 who offers to audibly monitor web events at one or more web sites accessed on the server 404. Preferably, the invention provides a business method that performs the process steps of the invention on a subscription, advertising and/or fee basis. In particular, a service provider, such as a solution integrator could offer to audibly monitor web events at one or more web sites accessed on one or more web servers. In this case, the service provider can, for instance, create, maintain, and support a computer infrastructure that performs the process steps of the invention for one or more customers. In return, the service provider can receive payment from the customer or customers under a subscription and/or fee agreement and/or the service provider can receive payment from the sale or advertising of content to one or more third parties.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for audibly monitoring web events at a web site, said method comprising:
  detecting at least one event at a web site;

responsive to said detecting, retrieving a numerical value of each audible data characteristic of a plurality of audible data characteristics from a mapping in a mapping file, said mapping comprising the numerical value of each audible data characteristic being mapped to the at least one event;

after said retrieving, selecting from a configuration file at least one audio device, each audio device comprising a sound generator configured to generate an audio tone encompassing the numerical values of the audible data characteristics; and after said selecting, sending the numerical values of the audible data characteristics to each audio device of the at least one audio device to enable each audio device to generate the audio tone encompassing the numerical values of the audible data characteristics, said numerical values of the audible data characteristics encompassed in said audio tone in each audio device identifying the at least one event.

2. The method of claim 1, wherein said detecting comprises monitoring the at least one event in a batch mode.

3. The method of claim 2, wherein said monitoring the at least one event in the batch modes comprises:
reading the at least one event from a log file that stores web events;
after said reading, ascertaining that the at least one event occurred within a specified time range; and
responsive to said ascertaining, determining that the mapping exists in the mapping file.

4. The method of claim 1, wherein the plurality of audible data characteristics comprises duration, pitch, loudness, and timbre.

5. The method of claim 1, wherein the at least one audio device comprises a cell phone of an owner of the web site.

6. The method of claim 1, wherein the at least one audio device comprises a plurality of audio devices, and wherein said sending the numerical values of the audible data characteristics comprises:
transmitting the numerical values of the audible data characteristics to a sequencer;
said sequencer receiving the numerical values of the audible data characteristics that had been transmitted; and
said sequencer sending the received numerical values of the audible data characteristics to the audio devices in a timed sequence such that the numerical values of the audible data characteristics is sent each audio device at a proper time with respect to the timed sequence.

7. The method of claim 1, wherein the plurality of audible data characteristics consists of duration, pitch, loudness, and timbre.

8. A computer system comprising a processor and a non-transitory computer readable memory unit coupled to the processor, said memory unit containing program code configured to be executed by the processor to implement a method for audibly monitoring web events at a web site, said method comprising:
detecting at least one event at a web site;
responsive to said detecting, retrieving a numerical value of each audible data characteristic of a plurality of audible data characteristics from a mapping in a mapping file, said mapping comprising the numerical value of each audible data characteristic being mapped to the at least one event;
after said retrieving, selecting from a configuration file at least one audio device, each audio device comprising a sound generator configured to generate an audio tone encompassing the numerical values of the audible data characteristics; and
after said selecting, sending the numerical values of the audible data characteristics to each audio device of the at least one audio device to enable each audio device to generate the audio tone encompassing the numerical values of the audible data characteristics, said numerical values of the audible data characteristics encompassed in said audio tone in each audio device identifying the at least one event.

9. The computer system of claim 8, wherein said detecting comprises monitoring the at least one event in a batch mode.

10. The computer system of claim 9, wherein said monitoring the at least one event in the batch modes comprises:
reading the at least one event from a log file that stores web events;
after said reading, ascertaining that the at least one event occurred within a specified time range; and
responsive to said ascertaining, determining that the mapping exists in the mapping file.

11. The computer system of claim 8, wherein the plurality of audible data characteristics comprises duration, pitch, loudness, and timbre.

12. The computer system of claim 8, wherein the at least one audio device comprises a plurality of audio devices, and wherein said sending the numerical values of the audible data characteristics comprises:
transmitting the numerical values of the audible data characteristics to a sequencer;
said sequencer receiving the numerical values of the audible data characteristics that had been transmitted; and
said sequencer sending the received numerical values of the audible data characteristics to the audio devices in a timed sequence such that the numerical values of the audible data characteristics is sent each audio device at a proper time with respect to the timed sequence.

13. The computer system of claim 8, wherein the plurality of audible data characteristics consists of duration, pitch, loudness, and timbre.

14. A computer program product, comprising a non-transitory computer readable storage medium having a computer readable program code stored therein, said computer readable program code containing instructions configured to be executed by a processor of a computer system to implement a method for audibly monitoring web events at a web site, said method comprising:
detecting at least one event at a web site;
responsive to said detecting, retrieving a numerical value of each audible data characteristic of a plurality of audible data characteristics from a mapping in a mapping file, said mapping comprising the numerical value of each audible data characteristic being mapped to the at least one event;
after said retrieving, selecting from a configuration file at least one audio device, each audio device comprising a sound generator configured to generate an audio tone encompassing the numerical values of the audible data characteristics; and
after said selecting, sending the numerical values of the audible data characteristics to each audio device of the at least one audio device to enable each audio device to generate the audio tone encompassing the numerical values of the audible data characteristics, said numerical values of the audible data characteristics encompassed in said audio tone in each audio device identifying the at least one event.

15. The computer program product of claim 14, wherein said detecting comprises monitoring the at least one event in a batch mode.

16. The computer program product of claim 15, wherein said monitoring the at least one event in the batch modes comprises:
   reading the at least one event from a log file that stores web events;
   after said reading, ascertaining that the at least one event occurred within a specified time range; and
   responsive to said ascertaining, determining that the mapping exists in the mapping file.

17. The computer program product of claim 14, wherein the plurality of audible data characteristics comprises duration, pitch, loudness, and timbre.

18. The computer program product of claim 14, wherein the at least one audio device comprises a cell phone of an owner of the web site.

19. The computer program product of claim 14, wherein the at least one audio device comprises a plurality of audio devices, and wherein said sending the numerical values of the audible data characteristics comprises:
   transmitting the numerical values of the audible data characteristics to a sequencer;
   said sequencer receiving the numerical values of the audible data characteristics that had been transmitted; and
   said sequencer sending the received numerical values of the audible data characteristics to the audio devices in a timed sequence such that the numerical values of the audible data characteristics is sent each audio device at a proper time with respect to the timed sequence.

20. The computer program product of claim 14, wherein the plurality of audible data characteristics consists of duration, pitch, loudness, and timbre.

21. A process for deploying computing infrastructure, said process comprising integrating computer-readable code into a computing system, wherein the code in combination with the computing system is configured to perform a method for audibly monitoring web events at a web site, said method comprising:
   detecting at least one event at a web site;
   responsive to said detecting, retrieving a numerical value of each audible data characteristic of a plurality of audible data characteristics from a mapping in a mapping file, said mapping comprising the numerical value of each audible data characteristic being mapped to the at least one event;
   after said retrieving, selecting from a configuration file at least one audio device, each audio device comprising a sound generator configured to generate an audio tone encompassing the numerical values of the audible data characteristics; and
   after said selecting, sending the numerical values of the audible data characteristics to each audio device of the at least one audio device to enable each audio device to generate the audio tone encompassing the numerical values of the audible data characteristics, said numerical values of the audible data characteristics encompassed in said audio tone in each audio device identifying the at least one event.

22. The process of claim 21, wherein said detecting comprises monitoring the at least one event in a batch mode.

23. The process of claim 22, wherein said monitoring the at least one event in the batch modes comprises:
   reading the at least one event from a log file that stores web events;
   after said reading, ascertaining that the at least one event occurred within a specified time range; and
   responsive to said ascertaining, determining that the mapping exists in the mapping file.

24. The process of claim 21, wherein the plurality of audible data characteristics comprises duration, pitch, loudness, and timbre.

25. The process of claim 21, wherein the at least one audio device comprises a cell phone of an owner of the web site.

26. The process of claim 21, wherein the at least one audio device comprises a plurality of audio devices, and wherein said sending the numerical values of the audible data characteristics comprises:
   transmitting the numerical values of the audible data characteristics to a sequencer;
   said sequencer receiving the numerical values of the audible data characteristics that had been transmitted; and
   said sequencer sending the received numerical values of the audible data characteristics to the audio devices in a timed sequence such that the numerical values of the audible data characteristics is sent each audio device at a proper time with respect to the timed sequence.

27. The process of claim 21, wherein the plurality of audible data characteristics consists of duration, pitch, loudness, and timbre.

* * * * *